United States Patent

Lewandowski et al.

[11] Patent Number: 5,979,991
[45] Date of Patent: Nov. 9, 1999

[54] VEHICLE HEADREST INCLUDING INTEGRATED SEAT BELT WEBBING GUIDE

[75] Inventors: Mark Lewandowski, West Bloomfield; Paul J. Sauve, Warren; Paul Larsen, Ortonville; Diane M. Valitutti, Macomb, all of Mich.

[73] Assignee: Chrysler Corporation, Auburn Hills, Mich.

[21] Appl. No.: 09/148,587

[22] Filed: Sep. 4, 1998

Related U.S. Application Data

[63] Continuation-in-part of application No. 08/911,803, Aug. 15, 1997.

[51] Int. Cl.⁶ ............................................. B60R 22/26
[52] U.S. Cl. ................................. 297/483; 297/391
[58] Field of Search .......................... 297/483, 484, 297/391; 280/808

[56] References Cited

U.S. PATENT DOCUMENTS

| | | | |
|---|---|---|---|
| 3,471,197 | 10/1969 | Ely | 297/483 |
| 3,844,001 | 10/1974 | Holmberg | 297/483 |
| 3,869,097 | 3/1975 | Peel et al. | 242/107 |
| 3,915,495 | 10/1975 | Oehm | 297/388 |
| 4,142,274 | 3/1979 | Scholz et al. | 24/163 R |
| 4,529,249 | 7/1985 | Ino | 297/474 |
| 4,568,106 | 2/1986 | Yokoyama | 280/807 |
| 4,648,625 | 3/1987 | Lynch | 297/483 |
| 4,730,875 | 3/1988 | Yoshitsuga | 297/483 |
| 4,944,557 | 7/1990 | Tsubai | 297/483 |
| 5,022,677 | 6/1991 | Barbiero | 280/801 |
| 5,263,741 | 11/1993 | Seros et al. | 297/483 |
| 5,330,228 | 7/1994 | Krebs et al. | 297/483 X |
| 5,364,170 | 11/1994 | West | 297/483 |
| 5,372,382 | 12/1994 | Whitens | 280/808 |
| 5,390,982 | 2/1995 | Johnson et al. | 297/410 |
| 5,829,841 | 11/1998 | Pywell et al. | 297/483 |

FOREIGN PATENT DOCUMENTS

| | | | |
|---|---|---|---|
| 3519346 | 12/1986 | Germany | 297/483 |
| 57-191148 | 11/1982 | Japan | 280/808 |
| 1-229744 | 9/1989 | Japan | 280/808 |

Primary Examiner—Peter R. Brown
Attorney, Agent, or Firm—James R. Lee

[57] ABSTRACT

An apparatus for guiding a seat belt webbing includes a first mounting portion and a guiding portion. The first mounting portion preferably includes an aperture adapted to receive a vertical post for conventionally mounting a head rest to a vehicle seat back. The guide portion defines an opening for receiving the seat belt webbing. In certain applications, the apparatus further includes a second mounting portion for releasably engaging the headrest. A bezel is disclosed for releasably attaching to the vertical post.

11 Claims, 6 Drawing Sheets

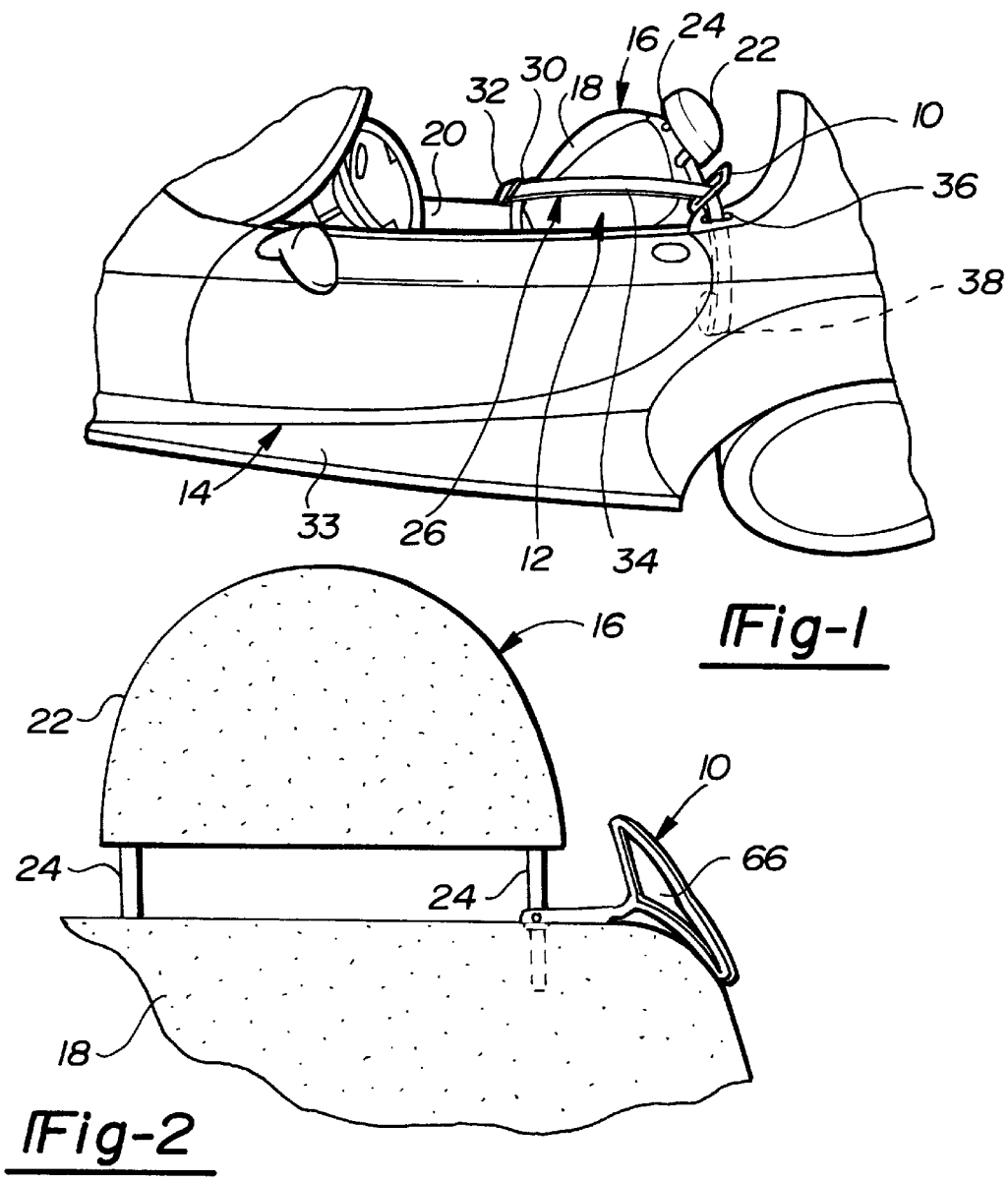
Fig-1
Fig-2
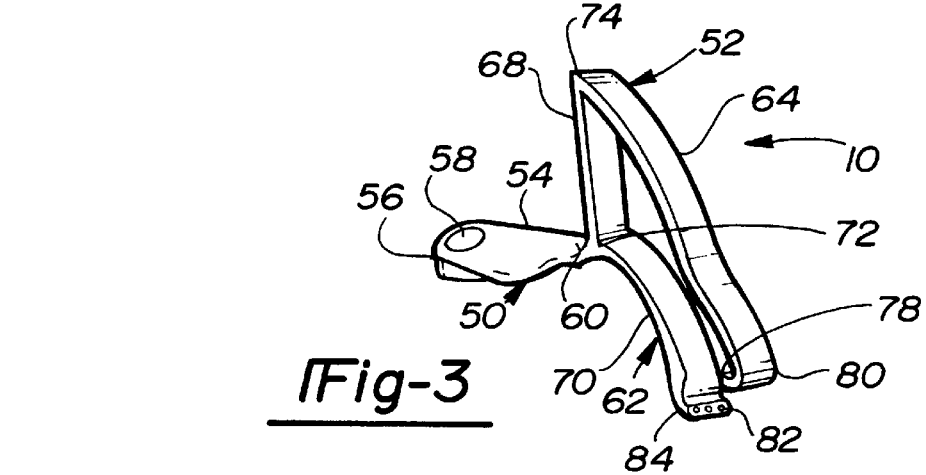
Fig-3

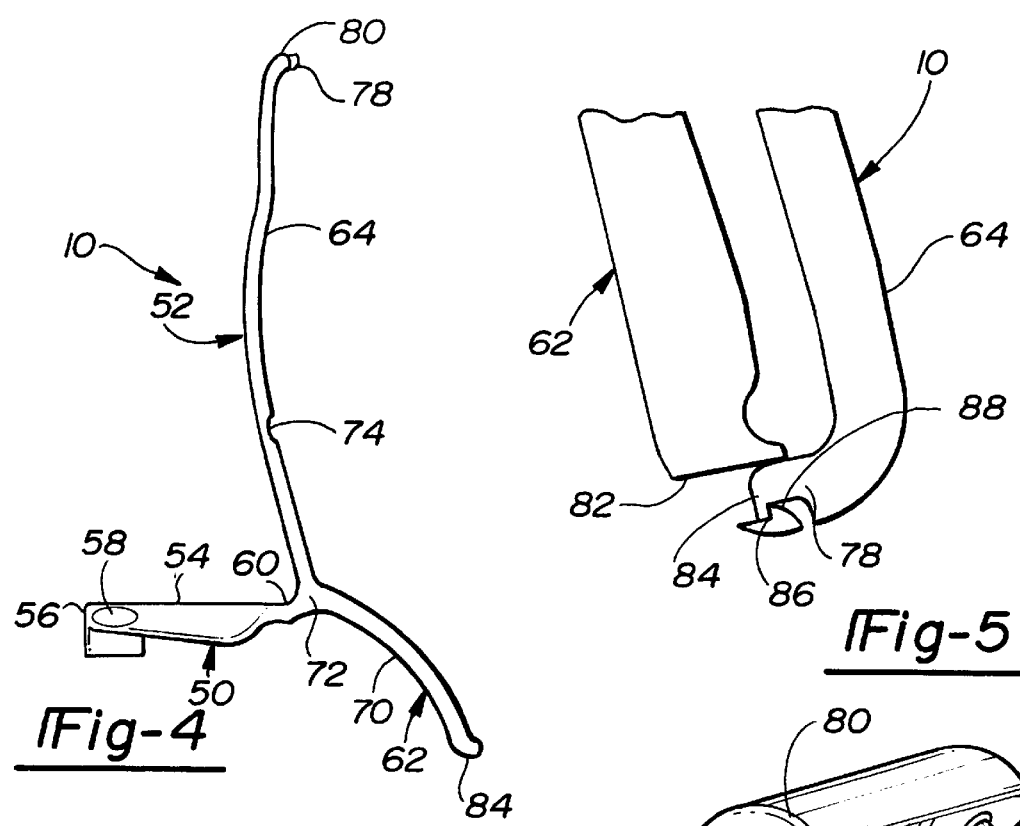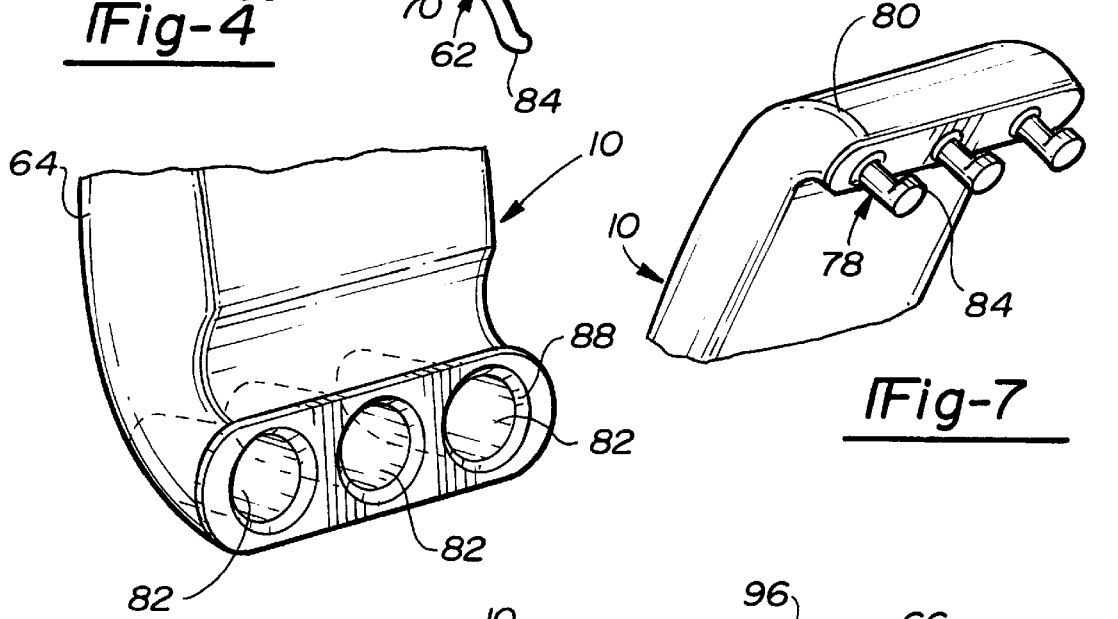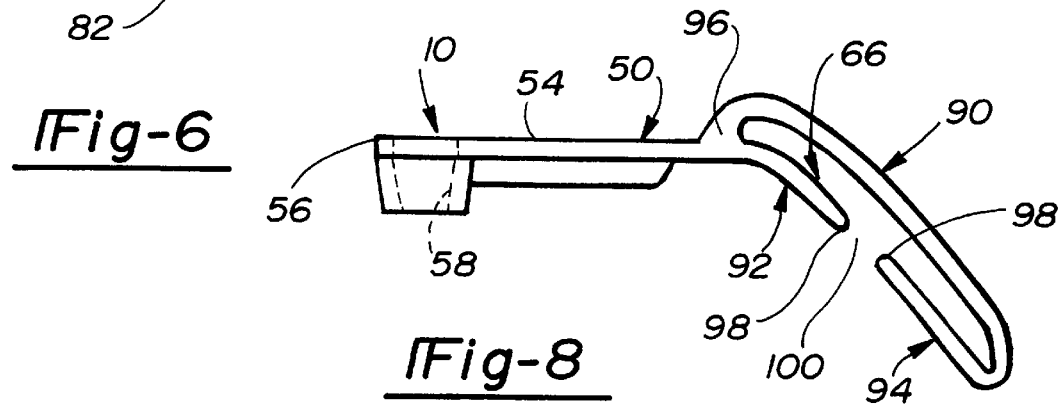

VEHICLE HEADREST INCLUDING INTEGRATED SEAT BELT WEBBING GUIDE

CROSS-REFERENCE TO RELATED APPLICATION

This is a continuation-in-part of commonly assigned U.S. Ser. No. 08/911,803, filed Aug. 15, 1997.

BACKGROUND OF THE INVENTION

1. Technical Field

The present invention generally relates to safety restraints for motor vehicles. More particularly, the present invention relates to a vehicle headrest including an integrated seat belt webbing guide for positioning an upper portion of a shoulder belt of a motor vehicle.

2. Discussion

Vehicle occupant restraint systems having a seat belt webbing and a guide for guiding the seat belt webbing are well known. In many known vehicle occupant restraint systems, a guide commonly known as a D-ring is attached to a vehicle pillar and vertically adjustable between different positions so that the D-ring and seat belt webbing may be vertically located relative to a particular vehicle occupant. However, a comfortable position of the seat belt webbing may be difficult to attain since the B-pillar may be longitudinally spaced from the vehicle seat. In this regard, the D-ring cannot horizontally travel with the vehicle seat if the seat is adjusted fore and aft. As a result, the seat belt may be difficult to reach (e.g., when the seat is in a foremost position). Additionally, passenger comfort may be compromised as the seat is moved fore and aft.

It is also known to provide a seat belt webbing guide integrally formed with the vehicle seat back. For example, in certain vehicles (e.g., various convertibles), a B-pillar is not present for seat belt webbing or D-ring attachment. Integrally formed webbing guides, while effective, increase production expense and are often considered to negatively effect vehicle styling.

SUMMARY OF THE INVENTION

It is a general object of the present invention to provide a seat belt webbing guide carried by a vehicle seat which is inexpensive to manufacture and easy to assemble.

It is another particular object of the present invention to provide a seat belt webbing guide adapted to mount to one of the upwardly extending mounting posts of a vehicle seat head rest.

It is another related object of the present invention to provide a vehicle headrest including an integrated seat belt webbing guide. In one form, the present invention provides an apparatus for guiding a seat belt webbing, including a mounting portion and a guide portion. The mounting portion is adapted for interconnecting the apparatus with a vehicle. The guide portion is interconnected to the mounting portion and defines an opening for receiving the seat belt webbing. The opening is partially defined by a movable arm. The arm is movable between a first position for permitting insertion and withdrawal of the seat belt webbing guide relative to the opening and a second positioning for preventing withdrawal of the seat belt webbing from the opening.

In a more preferred form, the present invention comprises an arrangement for restraining an occupant of a motor vehicle relative to a vehicle seat. The vehicle seat has a head rest attached to a seat back through a pair of vertical posts. The arrangement includes a seat belt webbing guide including a shoulder belt section. The arrangement further includes a seat belt webbing guide for guiding the shoulder belt section. The seat belt webbing guide includes a mounting portion and a guide portion. The mounting portion has an aperture adapted to receive one of the pair of vertical posts of the vehicle seat. The guide portion is interconnected to the mounting portion and defines an opening for receiving the seat belt webbing. The opening is at least partially defined by a fixed arm and a movable arm. A living hinge interconnects the fixed arm and the movable arm.

In another form, the present invention provides an arrangement for restraining an occupant of a motor vehicle relative to a vehicle seat. The vehicle seat has a headrest attached to a seat back through a pair of vertical posts. The arrangement includes a guide portion defining an opening for receiving the seat belt webbing. The arrangement further includes first and second attachment portions for attachment to one of the pair of vertical posts. Preferably, the first mounting portion defines an aperture for receiving the vertical post and the second mounting portion is adapted to releasably engage the vertical post.

Additional benefits and advantages of the present invention will become apparent to those skilled in the art to which this invention relates from a reading of the subsequent description of the preferred embodiments and the appended claims, taken in conjunction with the accompanying drawings.

BRIEF DESCRIPTION OF THE DRAWINGS

FIG. 1 is a fragmentary view of an exemplary vehicle shown incorporating a seat belt webbing guide constructed in accordance with the teachings of a first preferred embodiment of the present invention.

FIG. 2 is an enlarged front view of a portion of the vehicle seat of FIG. 1, further detailing the mounting of the seat belt webbing guide of the present invention on the outboard mounting post for the seat head rest.

FIG. 3 is an enlarged perspective view of the seat belt webbing guide of FIG. 1.

FIG. 4 is a simplified side view of the seat belt webbing guide shown in a fully open position.

FIG. 5 is a fragmentary cross-sectional view of a portion of the seat belt webbing guide illustrating the cooperating portions which maintain the seat belt webbing guide in a closed position.

FIG. 6 is a fragmentary perspective view of a portion of the seat belt webbing guide further illustrating the male portions.

FIG. 7 is a fragmentary perspective view of a portion of the seat belt webbing guide further illustrating the female portions.

FIG. 8 is a front view of a seat belt webbing guide constructed in accordance with the teachings of an alternative embodiment of the present invention.

DETAILED DESCRIPTION OF THE PREFERRED EMBODIMENTS

I. First Preferred Embodiment

Figure 9:
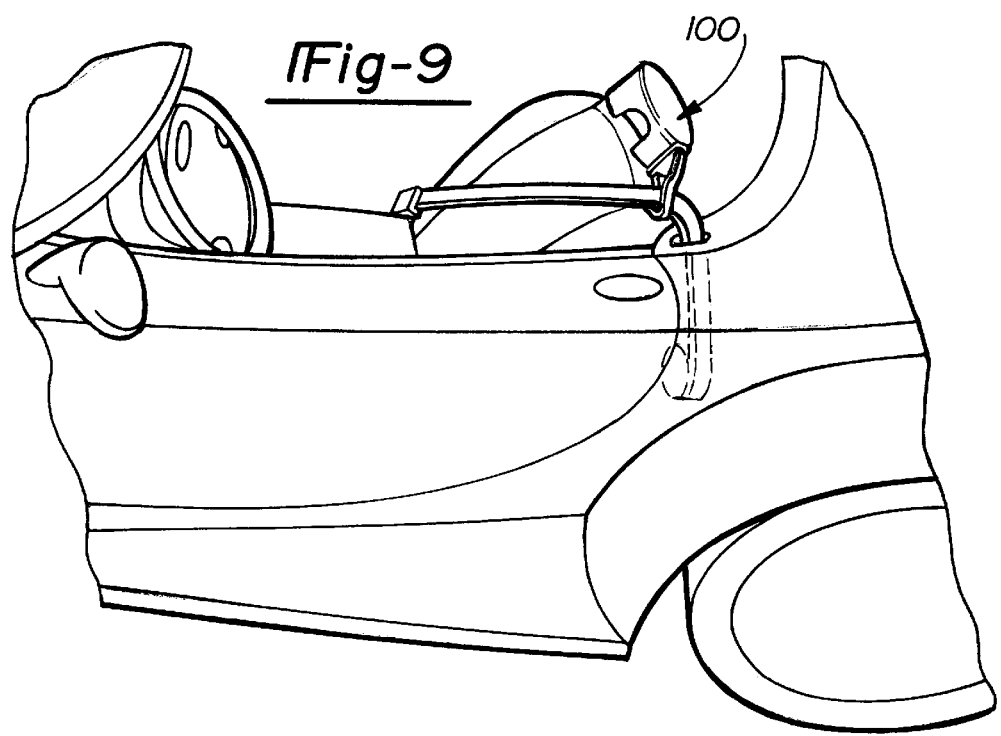
FIG. 9 is a partial view of an exemplary vehicle similar to FIG. 1, shown incorporating a headrest including an integrated seat belt webbing guide constructed in accordance with the teachings of a second preferred embodiment of the present invention.

With reference to FIGS. 1 and 2, a seat belt webbing guide 10 constructed in accordance with the teachings of a first preferred embodiment of the present invention is illustrated incorporated into an exemplary occupant restraint system 12 of a motor vehicle 14. Prior to addressing the construction and function of the seat belt webbing guide 10, a brief understanding of the occupant restraint system 12 which is otherwise of conventional construction is warranted.

The present invention is illustrated in FIGS. 1 and 2 as applied to a three-point vehicle safety belt system 12 for restraining forward movement of a vehicle occupant in the event of vehicle deceleration above a predetermined magnitude, such as occurs in a vehicle collision. It should be understood that the present invention could be applied to other safety belt systems. As shown in the fragmentary view of FIG. 1, a vehicle seat is illustrated as a front driver seat 16 in the vehicle 14. The vehicle seat 16 is of conventional construction including a seat back 18, a seat cushion 20 and a head rest 22 attached to the seat back 18 by two upwardly extending posts 24.

The vehicle safety belt system 12 includes a length of seat belt webbing 26 which is extendable about the vehicle occupant (not shown) in a conventional manner. A lap belt section 28 of the seat belt webbing 26 has one end (not shown) anchored to the vehicle body at an anchor point and extends across the seat cushion 20 to a tongue assembly 30 received in a buckle 32 secured to the vehicle body 33. A shoulder belt section 34 of the seat belt webbing 26 extends from the tongue assembly 30 diagonally across the seat back 18. The seat belt webbing 26 passes through an opening 36 in the vehicle body 33 and extends vertically downward to seat belt retractor 38 having an pretensioner of any known construction. Since the construction and operation of the seat belt pretensioner are known, such will not be described herein.

With continued reference to FIGS. 1 and 2 and additional reference to FIGS. 3–7, the seat belt webbing guide 10 of the present invention is shown to include a mounting portion 50 and a webbing guide portion 52. The mounting portion 50 is preferably adapted to cooperate with the outboard post 24 for positioning the guide portion 52 relative to the seat back 18. In this regard, the mounting portion 50 includes a transversely extending segment 54 having a first end 56 through which an aperture 58 passes. The aperture 58 is adapted to receive the outboard post 24. The transverse arm 54 includes a second end 60 joined to the guide portion 52.

The guide portion 52 is illustrated to preferably include a fixed arm 62 and a movable arm 64. The fixed and movable arms 62 and 64 cooperate to define an opening 66 for receiving the seat belt webbing 26. The opening 66 narrows as it extends downwardly bottom to prevent twisting of the seat belt webbing 26. The fixed arm 62 includes an upwardly extending segment 68 and a downwardly extending segment 70 which mutually join with the second end 60 of the mounting portion 50 at a joint 72.

The movable arm 64 is pivotally interconnected to the fixed arm 62 through a living hinge 74. The living hinge 74 permits movement of the movable arm 64 between a closed position (as shown in FIGS. 1 and 2) and an open position (partially shown in FIG. 3 and fully shown in FIG. 4). In its closed position, the seat belt webbing guide 10 functions to retain and guide the seat belt webbing 26 within the opening 66. Upon opening the seat belt webbing guide 10, the seat belt webbing 26 may be removed from or inserted into the opening 66.

The seat belt webbing guide 10 further includes a latching arrangement for releasably retaining the movable arm 64 in its closed position. The latching arrangement is shown most clearly in FIGS. 5 through 7 to include a plurality of male portions 78 extending from a distal end 80 of the movable arms 64 and a corresponding plurality of female portions or apertures 82 located in a distal end 84 of the lower segment 70 of the fixed arm 62. In the exemplary embodiment illustrated, the male portions 78 and apertures 82 are three in number. As most particularly shown in the cross-sectional view of FIG. 5, the male portions 78 are each formed to include an enlarged end 84 to cooperate with a lip 86 formed within the apertures 82. The openings defining each of the apertures 82 includes a chamfered surface 88 to facilitate insertion of the male portions 78.

Turning to FIG. 8, a side view of a seat belt webbing guide 10' constructed in accordance with an alternative embodiment of the present invention is illustrated. Elements between the alternative embodiment and the first preferred embodiment of FIGS. 1–7 are identified in FIG. 8 with common reference numerals. The alternative embodiment 10' differs from the first preferred embodiment 10 in that the opening 66 is defined by a fixed arm 90 having a general U-shaped and a pair of dependent segments 92 and 94. One of the dependent segments 92 extends from a junction 96 between the mounting portion 50 and the fixed arm 90 and the other segment 94 extends from the other end of the fixed arm 90. The distal ends 98 of the dependent segments are spaced apart to define a gap 100 for permitting the seat belt webbing guide 26 to be introduced into and withdrawn from the opening 66.

In both the first preferred embodiment and the alternative embodiment, the seat belt webbing guides 10 and 10' are unitarily molded of plastic. The molded position of the guide 10 is shown in the side view of FIG. 4. Alternatively, it will be understood that any other suitable material may be utilized.

II. Second Preferred Embodiment

Figure 10:
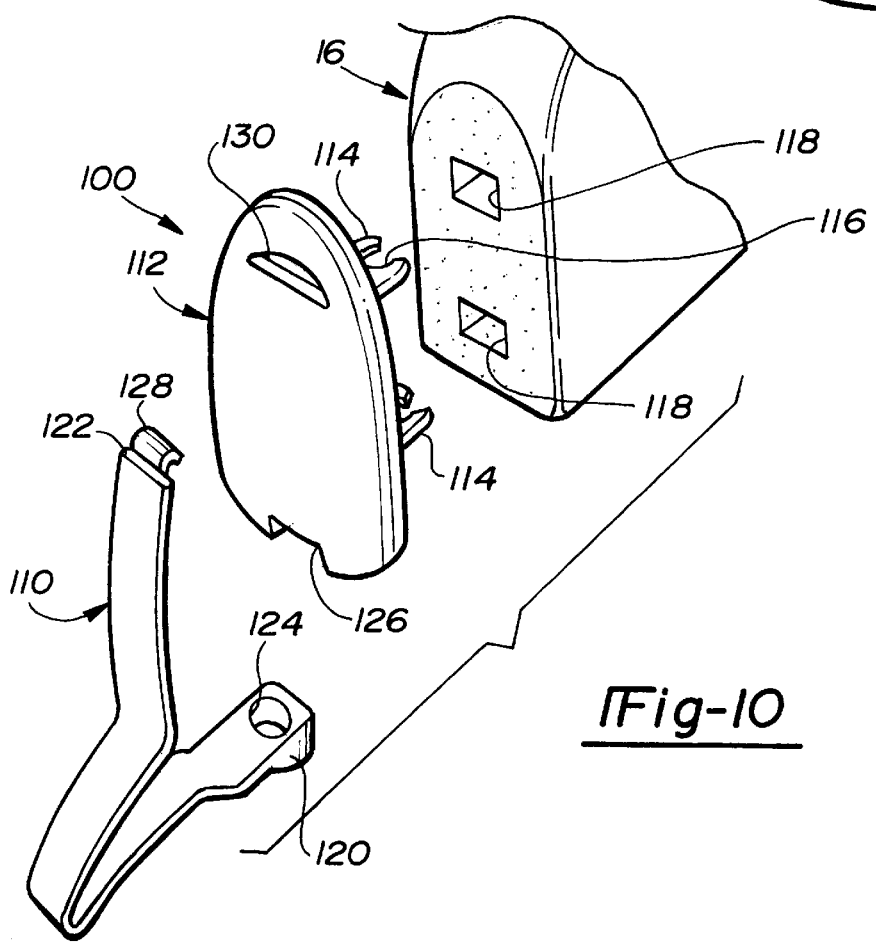
FIG. 10 is an enlarged and partially exploded perspective view of a portion of the headrest of FIG. 9.
Figure 11:
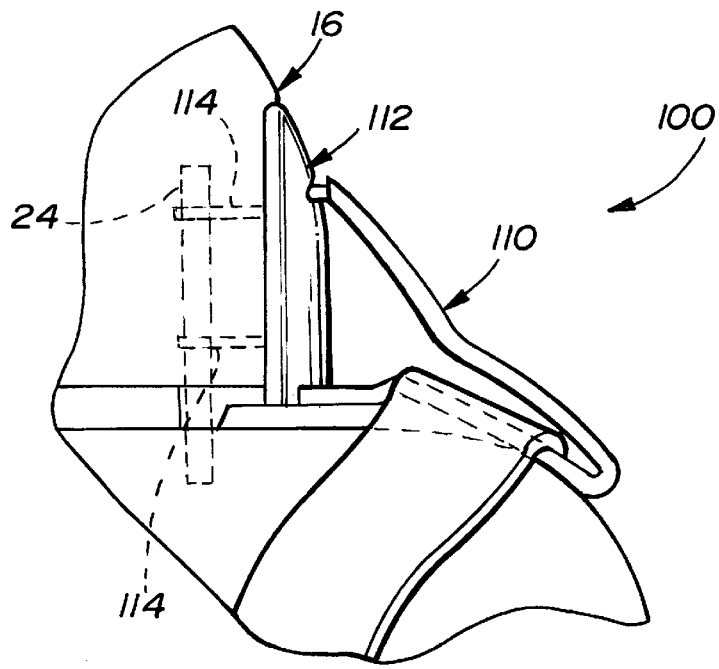
FIG. 11 is an enlarged front view of a portion of the headrest of FIG. 9.

Turning to FIGS. 9 through 11, a second preferred embodiment of the present invention is illustrated as a headrest assembly 100. Common with the first preferred embodiment, the headrest assembly 100 includes a seat belt webbing guide 110 adapted to engage one of the vertical posts 24 of the headrest assembly 100.

The headrest assembly 100 of the second preferred embodiment of the present invention is illustrated to include a bezel 112 adapted to releasably engage the headrest 16. In the exemplary embodiment illustrated, the bezel 112 is shown to include a pair of attachment portions 114 for releasably engaging the vertical post 24. The attachment portions 114 are each generally C-shaped and define a recess 116 for engaging the posts 24. The attachment portions 114 extend through apertures 118 provided in a body of the headrest 16.

The seat belt webbing guide 110 is illustrated to include first and second ends 120 and 122. The first end 120 defines an aperture 124 for receiving the vertical mounting post 24. The bezel 112 includes a lower slot 126 for accommodating the first end 120.

In the exemplary embodiment illustrated, the second end 122 is specifically adapted to releasably engage the bezel 112. In this regard, the second end 122 is formed to include a hook portion 128 for engaging an aperture 130 provided in the bezel 112.

III. Third Preferred Embodiment

Figure 12:
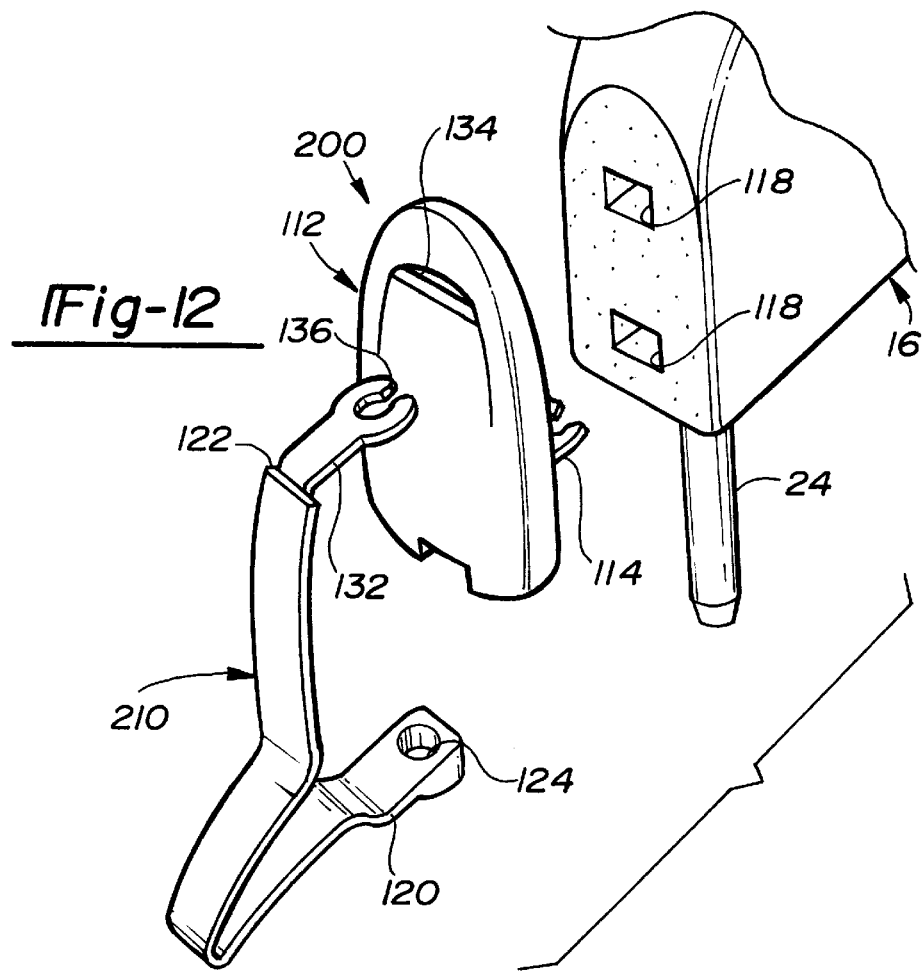
FIG. 12 is a view similar to FIG. 10 illustrating a headrest including an integrated seat belt webbing guide constructed in accordance with the teachings of a third preferred embodiment of the present invention.
Figure 13:
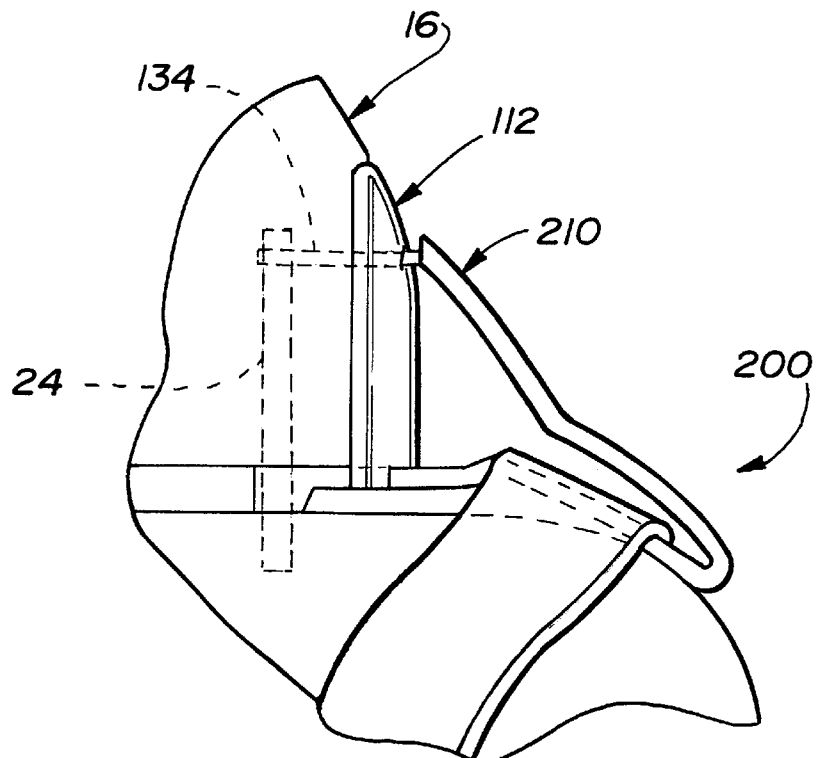
FIG. 13 is a side view similar to FIG. 11, illustrating the headrest of FIG. 12.

Turning to FIGS. 12 and 13, a headrest assembly 200 constructed in accordance with the teachings of a third preferred embodiment of the present invention is illustrated. Again common with the first preferred embodiment, the headrest assembly 200 includes a seat belt webbing guide 210 adapted to engage one of the vertical posts 24 of the headrest assembly 200.

Similar to the headrest assembly 100 of the second preferred embodiment of the present invention, the headrest assembly 200 of the third preferred embodiment includes a bezel 112 and a seat belt webbing 210 including first and second ends 120 and 122. As with the second preferred embodiment, the first end 120 of the seat belt webbing guide 210 defines an aperture 124 for receiving the vertical mounting post 24. The bezel 112 of the head rest assembly 200 includes a single attachment portion 114 which passes through an aperture 118 in a body of the head rest 16 to releasably engage the vertical mounting post 24. Distinct from the second preferred embodiment, the second end 122 of the seat belt webbing guide 210 is formed to include a second engagement portion 132 which passes through an aperture 134 provided in the bezel 112 and one of the apertures 118 provided in the body of the headrest 16 for releasably engaging the vertical post 24. The mounting portion 132 is generally C-shaped and defines a recess 136 for releasably receiving the mounting post 24.

IV. Fourth Preferred Embodiment

Figure 15:
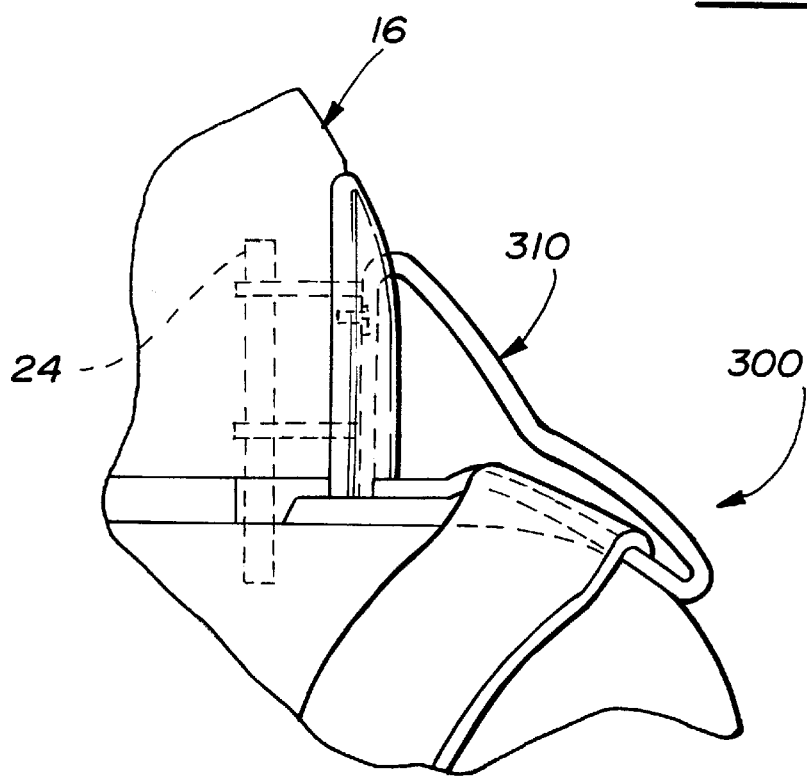
FIG. 15 is an enlarged front view similar to FIG. 10 illustrating a portion of the headrest of FIG. 14.
Figure 14:
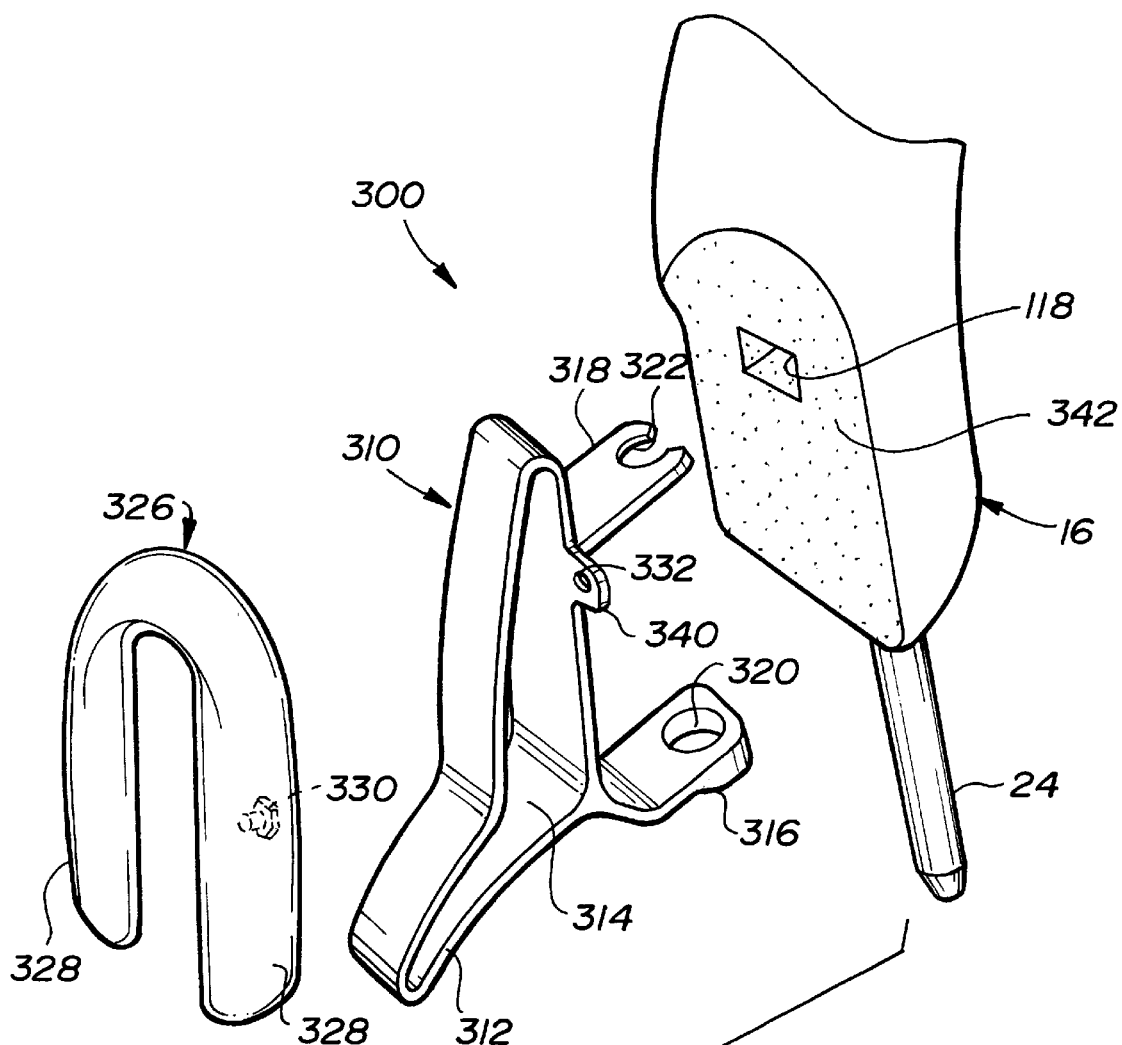
FIG. 14 is another view similar to FIG. 10 illustrating a headrest including an integrated seat belt webbing guide constructed in accordance with the teachings of a fourth preferred embodiment of the present invention.

Turning finally to FIGS. 14 and 15, a headrest assembly 300 constructed in accordance with the teachings of a fourth preferred embodiment of the present invention is illustrated. Again common with the first preferred embodiment, the headrest assembly 300 includes a seat belt webbing guide 310 adapted to engage one of the vertical posts 24 of the headrest assembly 300.

The seat belt webbing guide 310 of the fourth preferred embodiment is shown to include a guiding portion 312 defining an opening 314 for receiving the seat belt webbing 26. The seat belt webbing guide 310 is further shown to include first and second mounting portions 316 and 318. The first mounting portion 316 defines an aperture 320 adapted to receive the vertical mounting post 24. The second mounting portion 318 is generally C-shaped and defines a recess 322 for releasably receiving the mounting post 24. The second mounting portion 38 is adapted to pass through an aperture 118 provided in a body of the headrest 16.

The headrest assembly 300 of the fourth preferred embodiment is further shown to include a bezel 326 for attachment to the body of the headrest 16. The bezel 326 is generally U-shaped and includes a pair of downwardly extending legs 328. The bezel 326 is attached to the body of the headrest 16 through a fastener 330 which is carried thereby and is adapted to pass through an aperture 332 provided in a mounting flange 340 of the webbing guide 310 and engage a mounting hole 342 provided in the body of the headrest 16.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. An arrangement for guiding a seat belt webbing in combination with a headrest of a vehicle, the headrest including an upwardly extending mounting post, the arrangement comprising:

a seat belt webbing guide defining an opening for receiving the seat belt webbing, said seat belt webbing guide including a first end defining a first attachment portion and a second end defining a second attachment portion, said first and second attachment portions interconnected to the headrest, said first attachment portion directly engaging the upwardly extending mounting post; and a bezel secured to the headrest;

said second attachment portion releasably engaging said bezel.

2. The arrangement for guiding a seat belt webbing of claim 1, wherein said first attachment portion defines an aperture for receiving the mounting post.

3. The arrangement for guiding a seat belt webbing of claim 1, wherein said second attachment portion includes a hook portion releasably engaging a portion of said bezel.

4. The arrangement for guiding a seat belt webbing of claim 1, wherein said bezel includes a generally C-shaped attachment portion releasably engaging the mounting post.

5. An arrangement for guiding a seat belt webbing and restraining an occupant of a motor vehicle relative to a vehicle seat in combination with a headrest of the vehicle seat, the headrest attached to a seat back through a pair of vertical posts, the arrangement comprising:

a guide portion defining an opening for receiving and guiding the seat belt webbing, said guide portion including a first end defining a first attachment portion and a second end defining a second attachment portion;

said first attachment portion including an aperture receiving one of the pair of vertical posts;

said second attachment portion releasably engaging said one of the pair of vertical posts.

6. The arrangement for restraining an occupant of a motor vehicle of claim 5, further comprising a bezel including a mounting portion for engaging said one of said pair of vertical posts.

7. The arrangement for restraining an occupant of a motor vehicle of claim 6, wherein said bezel defines an opening, said second attachment portion passing through said opening.

8. The arrangement for restraining an occupant of a motor vehicle of claim 5, wherein said first and second ends engage said one of the pair of vertical posts at vertically spaced apart points.

9. An arrangement for restraining an occupant of a motor vehicle relative to a vehicle seat in combination with the vehicle seat, the vehicle seat having a headrest attached to a seat back through a pair of vertical posts, the arrangement comprising:

a guide portion defining an opening for receiving and guiding the seat belt webbing, said guide portion including first and second ends connected to one of the pair of vertical posts at vertically spaced apart points, at least one of said first and second ends including a recess adapted to releasably engaging one of the pair of vertical posts.

10. The arrangement for restraining an occupant of a motor vehicle relative to a vehicle seat of claim 9, further comprising a bezel including a mounting portion for engaging said one of said pair of vertical posts.

11. The arrangement for restraining an occupant of a motor vehicle relative to a vehicle seat of claim 9, wherein said bezel defines an opening, said second end passing through said opening.

\* \* \* \* \*